UNITED STATES PATENT OFFICE.

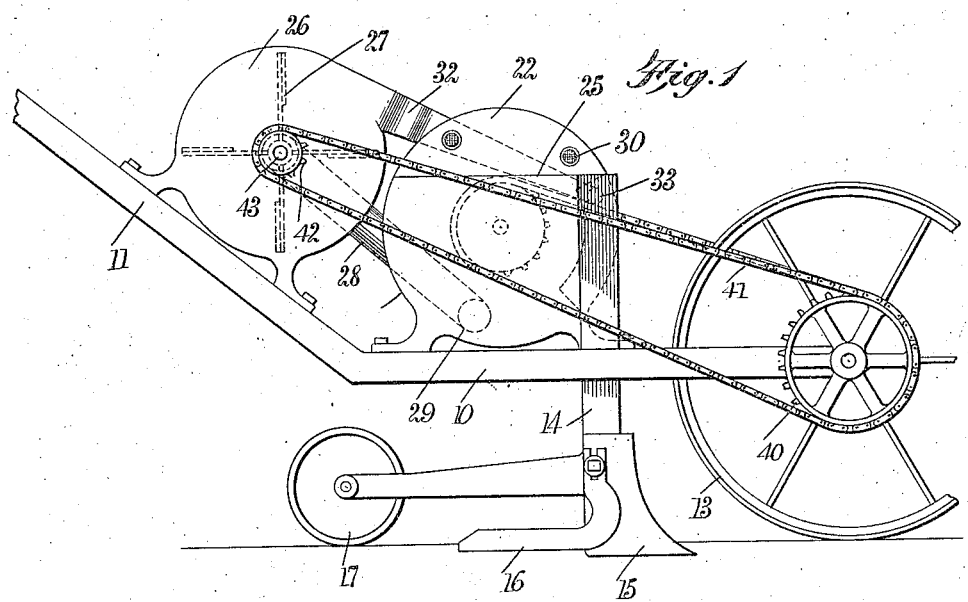

CHARLES KNOPP, OF WINONA, MINNESOTA.

SEED-PLANTER.

1,046,199.   Specification of Letters Patent.   Patented Dec. 3, 1912.

Application filed April 16, 1912. Serial No. 691,094.

*To all whom it may concern:*

Be it known that I, CHARLES KNOPP, a citizen of the United States, and a resident of Winona, in the county of Winona and State of Minnesota, have invented a new and Improved Seed-Planter, of which the following is a full, clear, and exact description.

My invention relates to agricultural implements for dropping a plurality of seeds at a given distance apart in a row, and the invention is especially intended for embodiment in an implement for planting sugar beets and like plants, which are usually planted in continuous rows, and which, when the plants have grown to a considerable height, are thinned out by a chopper.

An object of my invention is to provide an implement which will be so efficient in action as to drop the seeds in sufficient number and at such distances apart as to avoid the waste of seed and labor in subsequently chopping out the superfluous plants.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a side elevation of a seed planter embodying my invention; Fig. 2 is a plan view thereof; Fig. 3 is an inner face view of a fixed portion of the housing forming part of an inclosure subject to suction and an air blast utilized in taking the seed from the hopper to the dropper tube; Fig. 4 is a detail fragmentary side view with parts broken away and others in section, showing the hopper, seed carrier and dropper tube, and indicating in dotted lines parts appurtenant to the members shown in Fig. 3; Fig. 5 is a vertical section taken through the hopper, seed carrier and air chamber, showing the seed carrier in a position to receive seed from the hopper; and Fig. 6 is a similar section on an enlarged scale, showing a pocket of the seed carrier in position to have the seed discharged therefrom to the dropper tube the section being approximately on the line 6—6 of Fig. 2.

Before giving a description of the structure illustrated as one embodiment of my invention, it will be advantageous to give a brief general outline of my improved seed planter, as follows. A suitable handled frame is provided mounting a single runner wheel in the case of a hand planter as illustrated, and driving connections are established between the runner wheel and a fan; there are connections between the fan box and a housing, in which housing a seed carrier is mounted whereby a suction is produced in the housing of the seed carrier, to cause the seed to enter pockets in the seed carrier and adhere to the pockets, the carrier having a rotary movement to bring its pockets opposite an air blast from the fan to counteract the suction and discharge the seed to the dropper tube of the planter.

In constructing the form shown, a suitable horizontal frame 10 is provided with handles 11, and at the front end said frame mounts a single runner wheel 13. Rearward of the runner wheel is a dropper tube 14 provided at the lower end with a furrow opener or plow 15 of any approved form. In connection with the plow 15, any approved form of coverers 16, 17 may be employed. The parts referred to are known elements of seed planters.

On the frame 10 is mounted a preferably circular housing 20 consisting of a vertical side plate having a forwardly extending annular flange 21. The front side of the housing 20 is closed by a seed-carrying disk 22 mounted on a shaft 23, and outside of the seed carrier the frame 10 mounts a seed box 24, the open top 25 of which extends to near the top of the seed carrier 22, as shown in Figs. 1, 4 and 5. Rearward of the seed box and dropper is a casing 26 of a fan 27, the inlet pipe 28 of which communicates as at 29 with the interior of the housing 20. The housing 20 and the seed carrier 22 form a vacuum chamber subject to the action of the fan 27, the operation of the fan serving to cause a partial vacuum in said vacuum chamber, so that as the pockets 30 of the seed carrier come into register with the interior of the seed box 24, a partial vacuum in the housing 20 at the back of the pockets 30 will cause a suction through the said pockets, which results in a number of the seeds adhering to the screens 31 forming the bottoms of the pockets 30. The fan box 26 is formed with an outlet arm 32 which discharges at 33 within the housing 20, within an area isolated from the effect of the suction pipe 28, the isolated area being defined by a sector-shaped inclosure 34 formed by a flange 35 on the housing 20, as best illustrated in Fig. 3. The inclosure 35 communicates with the interior of the dropper tube 14, as clearly shown in Figs. 4 and 6. By the described arrangement, the operation of the fan causes a suction through the opening 29 and the fan inlet pipe 28, which results in the described partial vacuum in the vacuum chamber within the housing 20, and at the back of the seed carrier 22, while the discharge of the fan delivers a blast of air through the outlet arm 32 of the fan and the discharge outlet 33, the effect of which is to cause the pockets of the revolving seed carrier to each take up its complement of seeds, and as each pocket reaches the dropper tube 14 at a point in front of the fan discharge 33, a blast of air through said discharge forcibly expels the seed from the pocket, and the seed thus expelled will fall downward through the dropper tube to be acted upon by the planting devices 15, 16, 17, or their equivalents.

In the construction shown, the actuating means for the fan and for the seed carrier are as follows: The runner wheel 13 is provided with a sprocket wheel 40, and a sprocket chain 41 runs over said sprocket and over a sprocket 42 on the shaft 43 of the fan 27. A second sprocket wheel 45 is provided on the opposite end of the axle 46 of the runner wheel 13, and a second sprocket chain 41 runs over said wheel 45 and over the sprocket wheel 48 on the shaft 23 that carries the seed carrier 22. The capacity of the fan and the proportion of the suction pipes and discharge pipes thereof, and the size of the pockets 30 of the seed carrier are such, in practice, as to cause the predetermined number of seeds to be taken into a pocket and expelled therefrom.

The flange 35 surrounding the isolated area 34, by relieving the said area of the influence of the suction, gives the seed a tendency to gravitate from the successive pockets 30 upon said pockets arriving at the isolated area, at a point opposite the dropper 14. The provision of the air blast, however, to forcibly expel the seed makes the seed carrying and dropping positive.

I wish it to be understood that my invention is not limited to the exact form and arrangement of the parts shown, as it will be obvious that minor changes may be made within the spirit of my invention as defined in the claims hereinafter appended.

Having thus described my invention, I claim as new and desire to secure by Letters Patent:

1. The combination in a seed planter of a housing consisting of a vertical plate forming the back of the housing, and a forwardly projecting annular flange, said plate having a sector-shaped isolated area surrounded by a forwardly projecting flange, a driven seed-carrying disk formed with pockets the bottoms of the pockets communicating with the interior of the housing, said disk constituting the front of said housing and rotating relatively thereto and forming a closure for the front of said sector-shaped area, a dropper tube extending downward from the mentioned area within the housing, a seed box adjacent to the seed-carrying disk, a fan, a housing for the fan, said fan having a suction pipe communicating with the interior of the housing and serving to cause a partial vacuum therein behind the disk outside of the mentioned isolated area, and an outlet pipe communicating with the housing within the isolated area and serving to deliver a blast to the latter in the direction of the seed disk and dropper tube.

2. A seed planter, comprising a housing having a suction chamber and an area isolated from the suction chamber, means for producing suction in the suction chamber, a rotating seed-carrying disk extending over the front of the suction chamber and over the front of the isolated area, a seed box at the front of the disk, the disk having seed pockets at the front and facing the seed box, the pockets extending through the disk at the back thereof, and a dropper tube in front of the disk and located at a point opposite the mentioned isolated area of the housing.

3. A seed planter, comprising a housing having a suction chamber and an area isolated from the suction chamber, a rotating seed-carrying disk extending over the front of the suction chamber and over the front of the isolated area, a seed box at the front of the disk, the disk having seed pockets at the front and facing the seed box, the pockets extending through the disk to the back thereof, a dropper tube in front of the disk and located at a point opposite the mentioned isolated area of the housing, means for producing suction in the suction chamber of the housing, and means for producing an air blast within the isolated area of the housing.

In testimony whereof, I have signed my name to this specification in the presence of two subscribing witnesses.

CHARLES KNOPP.

Witnesses:
D. E. TAWNEY,
W. J. SMITH.